(12) United States Patent
Dazet (10) Patent No.: US 9,573,672 B2
(45) Date of Patent: Feb. 21, 2017

(54) DEVICE FOR PROTECTING THE FRONT SPAR STRUCTURE OF A CENTRAL CASING OF AN AIRCRAFT WING AND AT LEAST ONE PIECE OF EQUIPMENT LOCATED IN SAID WING

(71) Applicant: AIRBUS OPERATIONS (SAS), Toulouse (FR)

(72) Inventor: Francis Dazet, Tournous Darre (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 40 days.

(21) Appl. No.: 14/417,406

(22) PCT Filed: Jun. 20, 2013

(86) PCT No.: PCT/FR2013/051441
§ 371 (c)(1),
(2) Date: Jan. 26, 2015

(87) PCT Pub. No.: WO2014/016484
PCT Pub. Date: Jan. 30, 2014

(65) Prior Publication Data
US 2016/0176501 A1   Jun. 23, 2016

(30) Foreign Application Priority Data
Jul. 26, 2012   (FR) ..................... 12 57268

(51) Int. Cl.
*B64C 1/00*   (2006.01)
*B64C 3/00*   (2006.01)
(Continued)

(52) U.S. Cl.
CPC .............. *B64C 3/28* (2013.01); *B64D 45/00* (2013.01); *B64D 2045/0095* (2013.01)

(58) Field of Classification Search
CPC .............. B64C 3/28; B64C 3/16; B64C 3/18; B64C 3/182; B64C 3/185; B64C 3/187; B64C 3/50; B64C 2003/146; B64D 45/00; B64D 2045/0095
(Continued)

(56) References Cited

U.S. PATENT DOCUMENTS 2,390,761 A * 12/1945 Watter ..................... B64C 3/00
                                                           244/124
2,567,124 A *  9/1951 Roberts ................... B64C 3/18
                                                           244/124
(Continued)

FOREIGN PATENT DOCUMENTS

CN        102030102 A      4/2011
DE    102010034305 A1      2/2012
(Continued)

OTHER PUBLICATIONS

European Patent Office International Searching Authority, International Search Report for International Application No. PCT/FR2013/051441, dated Jan. 30, 2014.

*Primary Examiner* — Richard G Davis
(74) *Attorney, Agent, or Firm* — Lorenz & Kopf, LLP.

(57) ABSTRACT

A device for protecting a front spar structure of a central casing -of an aircraft wing and at least one item of equipment situated in the wing, comprising:
a shielding surface extending in front of the front spar of the central casing, from a surface of an intersection between the wing and the fuselage delimited by the root of the wing, transversely to the surface of intersection, to a first rib of the central casing partially surrounding at least one item of equipment; and
means -for fixing the shielding surface to the central casing producing an isostatic link.

18 Claims, 4 Drawing Sheets

(51) Int. Cl.
  *B64C 5/00*   (2006.01)
  *B64C 3/28*   (2006.01)
  *B64D 45/00*  (2006.01)

(58) Field of Classification Search
  USPC .............................................. 244/123.1, 131
  See application file for complete search history.

(56) References Cited

U.S. PATENT DOCUMENTS

| | | | | | |
|---|---|---|---|---|---|
| 2,589,193 | A * | 3/1952 | Mayne | .................. | B64C 27/473 244/123.1 |
| 2,613,893 | A * | 10/1952 | Young | .................. | B64C 3/28 244/123.1 |
| 5,362,347 | A * | 11/1994 | Domine | .................. | B29C 66/72 156/212 |
| 5,807,454 | A * | 9/1998 | Kawabe | .................. | B29C 70/443 156/214 |
| 6,834,830 | B2 * | 12/2004 | Fujino | .................. | B64C 3/14 244/198 |
| 8,123,167 | B2 | 2/2012 | Olmi et al. | | |
| 8,245,972 | B2 | 8/2012 | Capasso et al. | | |
| 8,256,719 | B2 * | 9/2012 | Wood | .................. | B64C 3/48 244/200 |
| 8,746,619 | B2 * | 6/2014 | Li | .................. | B64C 5/06 244/121 |
| 8,925,870 | B1 * | 1/2015 | Gordon | .................. | B64C 3/28 244/200 |
| 2002/0145075 | A1 * | 10/2002 | Page | .................. | B64C 1/0009 244/36 |
| 2007/0272799 | A1 * | 11/2007 | Verdan | .................. | B64C 3/28 244/123.6 |
| 2008/0258009 | A1 * | 10/2008 | Alvarez | .................. | B64C 3/24 244/133 |
| 2008/0265095 | A1 * | 10/2008 | Lee | .................. | B63B 1/244 244/129.1 |
| 2009/0101759 | A1 * | 4/2009 | West | .................. | B64C 3/26 244/214 |
| 2009/0127392 | A1 * | 5/2009 | Gross | .................. | B32B 3/02 244/121 |
| 2009/0277996 | A1 * | 11/2009 | Rinaldi | .................. | B64C 5/00 244/123.1 |
| 2010/0065687 | A1 * | 3/2010 | Douglas | .................. | B64C 3/185 244/130 |
| 2010/0148006 | A1 * | 6/2010 | Olmi | .................. | B64C 3/28 244/121 |
| 2010/0148007 | A1 * | 6/2010 | Manz | .................. | B64C 3/28 244/123.1 |
| 2011/0049298 | A1 * | 3/2011 | Makela | .................. | B64C 3/28 244/123.14 |
| 2012/0318922 | A1 * | 12/2012 | Saito | .................. | B64D 15/04 244/134 B |
| 2013/0277499 | A1 * | 10/2013 | Lecerf | .................. | B64C 3/28 244/123.1 |
| 2014/0166818 | A1 * | 6/2014 | Tanaka | .................. | B64C 9/22 244/214 |
| 2015/0048207 | A1 * | 2/2015 | Williams | .................. | B64C 3/00 244/123.7 |

FOREIGN PATENT DOCUMENTS

FR    2918036 A1    1/2009
GB    2471408 A    12/2010

* cited by examiner

DEVICE FOR PROTECTING THE FRONT SPAR STRUCTURE OF A CENTRAL CASING OF AN AIRCRAFT WING AND AT LEAST ONE PIECE OF EQUIPMENT LOCATED IN SAID WING

CROSS REFERENCE TO RELATED APPLICATION

This application is a U.S. National-Stage entry under 35 U.S.C. §371 based on International Application No. PCT/FR2013/070376 filed Jun. 11, 2013, and which claims priority to French Patent Application No. 1257268, filed Jul. 26, 2012, which are all incorporated herein by reference in their entirety.

TECHNICAL FIELD

The embodiments described herein described herein relate to a protection device for a front spar structure of a central casing of an aircraft wing and at least one item of equipment situated in this wing.

During a flight, aircraft are frequently subjected to bird impacts sometimes causing considerable damage to the wings, the nose cone, and sometimes the equipment located therein. Generally, to preserve the integrity of such equipment, shieldings are placed inside each wing in proximity to the leading edge so as to protect, in particular the tanks placed in the wings, and on the nose cone of the aircraft in order to protect the pilots and the navigation instruments. Most often, in particular with respect to the leading edges of the wings and of the tail units, the external aerodynamic surface of the profile is equipped with internal stiffeners, metallic or composite.

Alternatively or in combination with this solution, shieldings are installed at the rear of the aerodynamic surfaces, closely following the form of the profile (C-shaped), either planar or even beveled (V-shaped) so as to distribute the impact on either side of their front edge. However, there are areas of the aircraft, situated in proximity to the root of each wing, which often remain unprotected. In effect, usually, the internal area of each wing is protected only from (in the direction from wing root to wing end) an adjoining rib of the central casing of the wing (first rib).

Now, there are in this area hydraulic or electrical systems running in front of the spar such as ducts leading to the kerosene tank, and ducts for tapping hot air from the engine. Such systems can be damaged if a bird manages to break the spar, and therefore merit the provision of additional protection.

To this end, the embodiments relate to a protection device for a front spar structure of a central casing of an aircraft wing and at least one item of equipment situated in the wing.

BACKGROUND

Such a protection device comprises a shielding surface extending in front of the front spar of the central casing, from the surface of intersection between the wing and the fuselage delimited by the root of the wing, transversely to the surface of intersection, to a first rib of the central casing partially surrounding at least one item of equipment, and means for fixing the shielding surface to the central casing producing an isostatic link. Such a device makes it possible to protect the systems situated in the area of the root of the wing by benefiting from a robustness comparable to those of the shieldings that exist in other areas.

Unlike the shieldings of the prior art which were placed in proximity to the aerodynamic surfaces or which were planar, the device proposed in the present embodiment is placed in proximity to sensitive areas, set back from the aerodynamic surface, and surrounds the sensitive systems.

This makes it possible not only to give them more protection, but also to minimize the protection surface area, thus allowing for a weight saving without compromising the functionalities of the fuselage fairing.

Finally, the design simplicity of the device limits the installation times, which is particularly appreciable in an area where it is done on the final assembly line.

SUMMARY

The isostatic anchoring of the device to the central casing of the wing notably offers the advantage of taking into account the deformations of the wings, which are significant in this area where they can be considered to be flexible.

More particularly, the means for fixing the shielding surface to the central casing comprises a mechanical link from the shielding surface to the first rib of the central casing with three degrees of freedom. This notably makes it possible to retain degrees of freedom in the plane normal to the axis of the fuselage, at the point where the deformations are greatest.

According to one possible feature, the means for fixing the shielding surface to the central casing comprise a mechanical link from the shielding surface to the first rib of the central casing with two degrees of freedom. In this case, the displacements in the direction of elongation of the central casing can be blocked.

According to one possible feature, the means for fixing the shielding surface to the central casing comprise a mechanical link from the shielding surface to the front spar with a single degree of freedom in the axis normal to the first rib of the central casing.

Such a fixing thus takes into account the great rigidity of the wings in the axis of the fuselage.

The taking up of the impact forces in this direction with no contact in nominal operation ensures the diffusion of the energy of the impact from the device to the primary structure of the fuselage for a better absorption thereof.

Unlike the devices of the prior art in which the shielding surface is situated in the vicinity of the leading edge of the wing, the shielding surface is advantageously situated in immediate proximity to the front spar of the central casing and/or to at least one item of equipment. Thus, according to one possible feature, the shielding surface is closer to at least one item of equipment than to a leading wing surface. By placing the shielding surface as close as possible to the sensitive items of equipment, the latter are better protected.

According to a particular embodiment, the shielding surface has a C-shaped section in the plane of the surface of intersection.

According to another embodiment, the shielding surface comprises an edge normal to the surface of intersection.

The shielding surface can thus have a V-shaped section in the plane of the surface of the fuselage delimited by the root of the wing. This particular form comprising a blade at its center, makes it possible to deflect the bird or any other object striking the shielding surface on each side of the surface edge, and therefore minimize the energy to be contained by the shielding surface and the primary fuselage structure.

According to yet another embodiment, the shielding surface closely follows the form of at least one item of equipment.

In all cases, through its form, the shielding surface makes it possible to run the air, hydraulic and electricity (equipment) systems within the shielded surface, and thus secure them also from the impact.

To facilitate such runs, the shielding surface has at least one opening intended for the passage of at least one item of equipment. Optionally, the device comprises at least one additional link, linking the shielding surface to the structure of the fuselage of the aircraft, the additional link consisting of a lug protruding from the rear of the shielding surface and a fuselage hook protruding from the skin of the fuselage, the lug and hook being intended to cooperate with one another.

To increase the energy absorbed by the device, the shielded surface has a structure comprising successive shieldings. It can, for example, be produced in a high-strength aluminum alloy with strong elongation. In order to adapt the shielding surface to the equipment that it protects, it can have a variable thickness.

The embodiment relates also, according to a second aspect, to an aircraft wing comprising a central casing and at least one item of equipment in the internal space of said wing. This wing comprises a protection device for at least one item of equipment comprising a shielding surface extending in front of a front spar of the central casing, from the surface of intersection between the wing and the fuselage delimited by the wing root, transversely to the surface, to a first rib of the central casing partially surrounding at least one item of equipment.

An embodiment relates finally to an aircraft comprising such a wing.

BRIEF DESCRIPTION OF THE DRAWINGS

Other features and advantages will become apparent from the following description, given as a nonlimiting example and with reference to the attached drawings in which:

FIG. 6 is a schematic representation from above of two fixing points fixing the protection device of FIG. 4 to the front spar of the wing in;

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
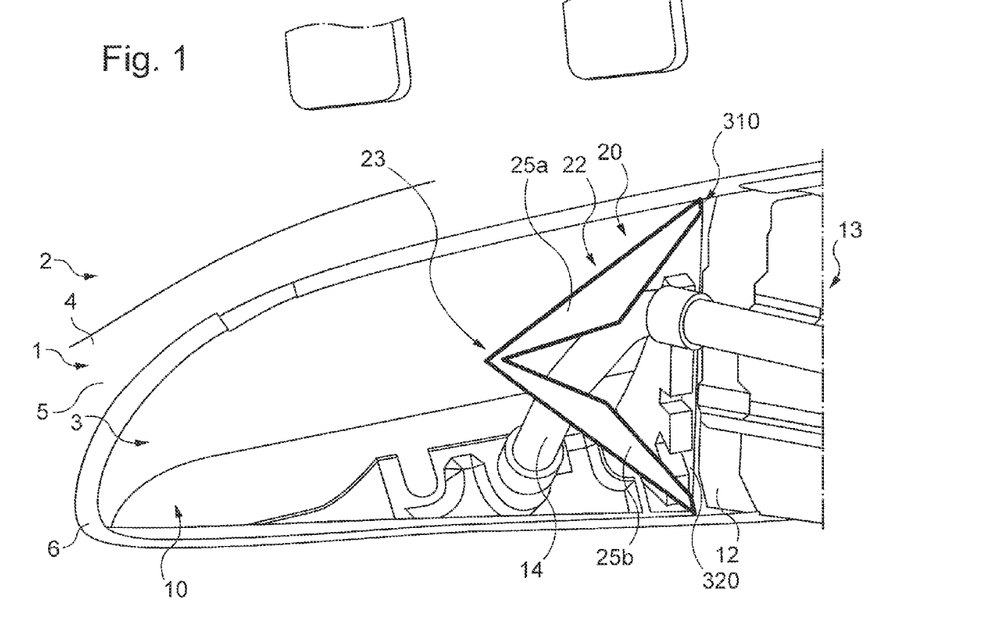
FIG. 1 is a schematic representation of the cross section, in the plane of its root, of an aircraft wing which comprises a device according to the embodiment in a first embodiment.

FIG. 1 shows a cross-sectional view of a wing 1 of an aircraft at its root, that is to say its junction with the body of the fuselage 2. This cross section is produced in the plane XZ of the aircraft, the axis X representing the longitudinal axis of the fuselage 2 and the axis Z being the vertical axis when the aircraft is on the ground. This plane corresponds notably to the plane in which extends the surface of intersection 3 between the wing 1 and the fuselage 2 delimited by the root 4. The wing 1 has an aerodynamic surface 5, the leading edge 6 of which is here represented on the left of FIG. 1.

The focus here is on the internal space 10 defined by this aerodynamic surface and the front spar 12 of the central casing 13 of the wing, which will not be described here in detail, since they are known to those skilled in the art and can vary in their form from one aircraft to another.

In the internal space 10, there are a certain number of equipment items that run therein. These equipment items include, but are not limited to, pipes containing fuel, electrical wires, feed pipes for the air conditioning system, etc.

A feed pipe 14 forming part of such equipment items is thus represented here.

In order to protect this equipment item, a first embodiment of the protection device 20 according to an embodiment is represented. The protection device 20 consists of means for fixing to the front spar 12 (details of this fixing will be given hereinbelow) a shielding surface 20 represented in cross section in FIG. 1. More specifically, the shielding surface 22 extends in front of the front spar 12 of the central casing 13, from the surface of intersection 3, transversely to this surface of intersection, to a first rib 24 of the central casing partially surrounding the pipe 14.

Figure 2:
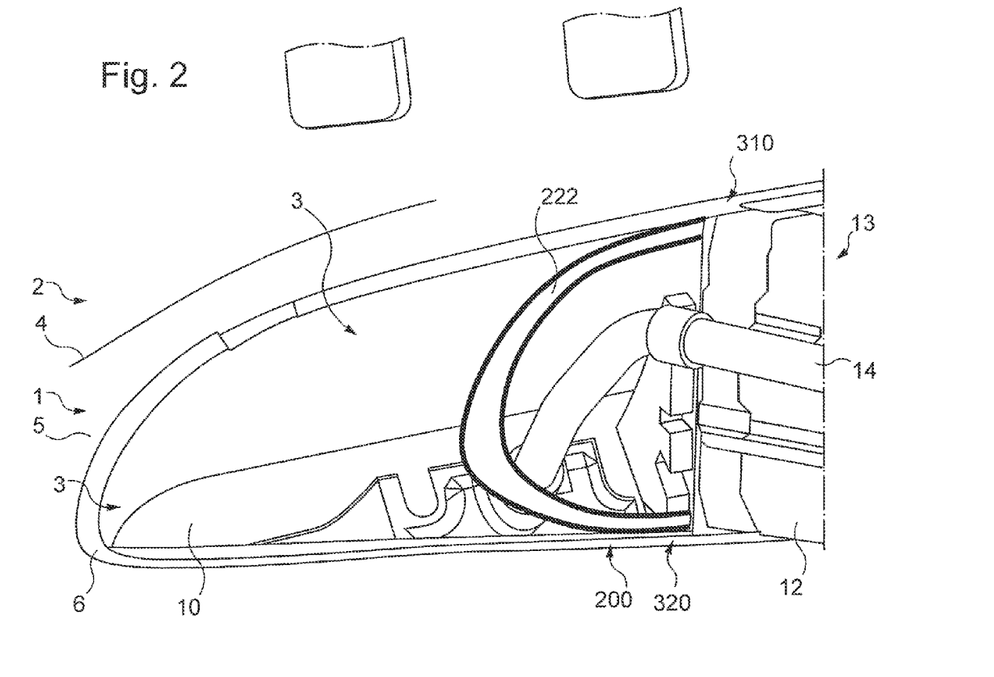
FIG. 2 is a schematic representation in perspective of the elements of FIG. 1.

Thus, as can be seen in FIGS. 1 and 2, that the shielding surface 22 covers an area extending, on the one hand, between the fuselage 2 and the first rib 24 of the central casing of the wing 1, and on the other hand, from the top end (along the axis Z) of the front spar 12, to the bottom end of the front spar 12.

The shielding surface 22 has an edge 23 approximately at mid-height of the front spar 12. This edge 23, situated toward the front of the wing (toward the leading edge 6), is normal to the surface of intersection 3. It divides the shielding surface 22 into two planar surfaces, an upper plate 25a and a lower plate 25b, giving it a V-shape in cross section. The edge 23 thus acts as a knife blade making it possible to split the bird upon the impact and thus divide the energy to be absorbed.

Figure 3:
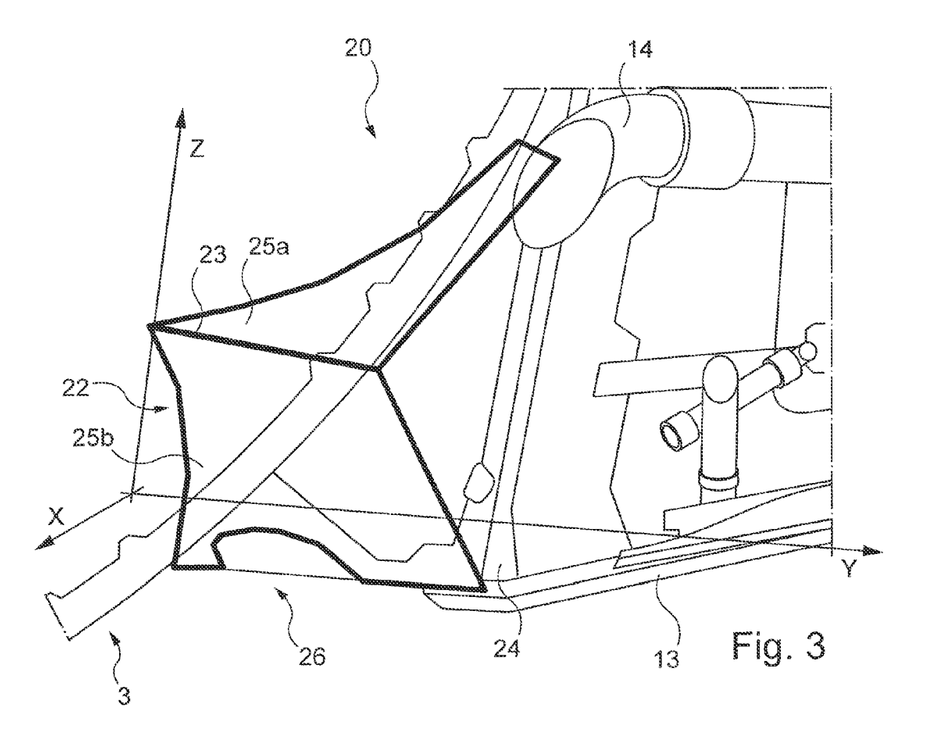
FIG. 3 is a schematic representation of the cross section, in the plane of its root, of an aircraft wing at its root comprising a device according to the embodiment in a second embodiment.

It will be noted that openings can be formed in the shielded surface 22 in order to allow certain items of equipment to pass through. Thus, as can be seen in FIG. 3, the lower plate 25b has an opening 26 in order to allow pipes (not represented) to pass. This type of opening makes it possible to allow existing systems to pass without having to modify them, and in no way compromises their protection.

FIG. 2. shows a second embodiment of the protection device.

In this second embodiment, the protection device 200 performs the same function with respect to the equipment and covers the same area of the internal space 10. The form of its shielding surface 222 is, however, different, because it is rounded. It thus surrounds the equipment such as the feed pipe 14 on as to have a C-shape in this cross-sectional view (that is to say in the plane XZ, or even the plane of the surface of intersection 3).

It will be noted that the thickness of the shielding surface 222 can vary as is the case in this figure where the surface is thicker approximately at mid-height of the spar.

This advantageously makes it possible to optimize the absorption of the energy according to the angle of impact.

In the two embodiments presented above, the upper and lower parts of the shielding surface make it possible to dispel the bird out of the tank area and the sensitive systems upward or downward, depending on the orientation of the impact. Whatever the form of the protection device, the materials of which the shielding surface can be made are preferably metallic absorbent materials, for example aluminum, or even expanded and rigidified mineral fibers. Preference will be given to a honeycomb structure.

There now follows a description of the means for fixing the protection device according to the embodiment to the front spar 12.

For this, the first embodiment will be taken as the example, bearing in mind that the second embodiment can have an equivalent fixing method.

Figure 4:
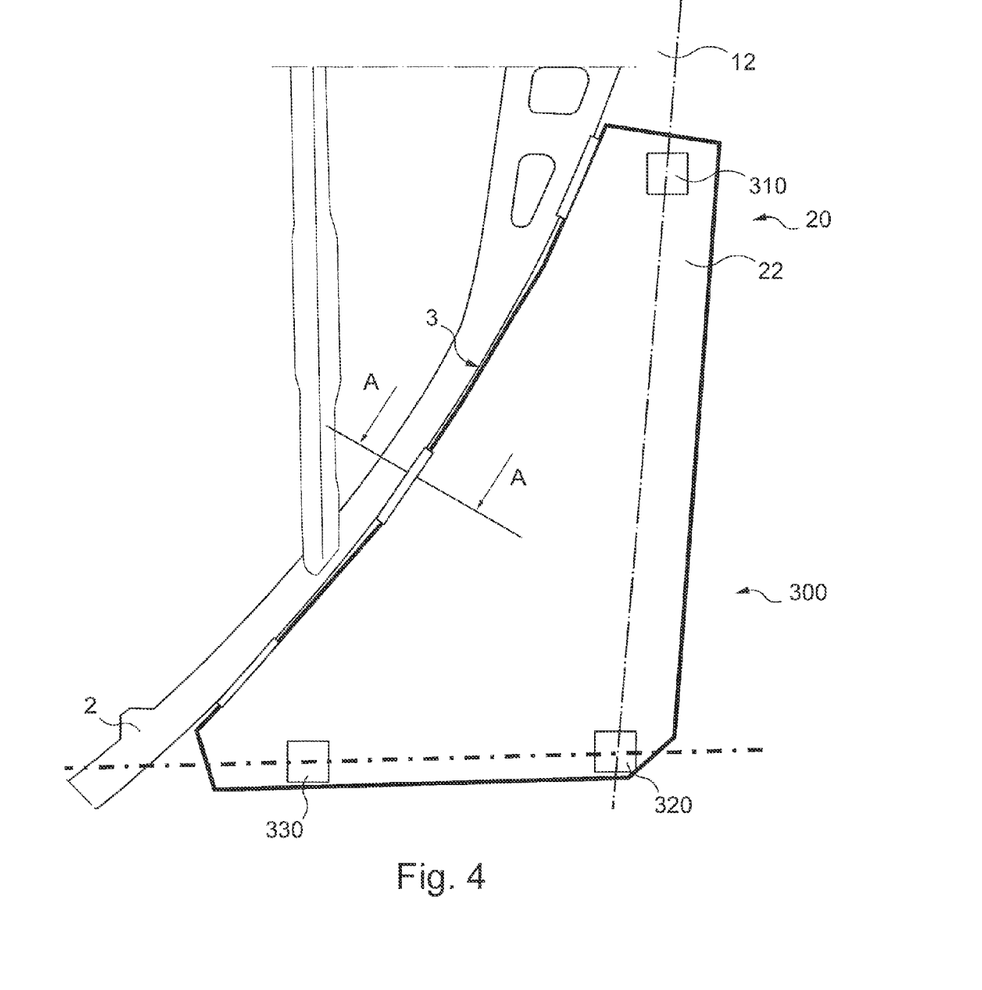
FIG. 4 is a schematic representation of the protection device of FIG. 2 in the plane of the front spar of the central casing of the wing.

FIG. 4 represents the front face of the front spar 12 of the central casing of the wing and the fixing points of the shielding surface 22 of the device according to an embodiment. The shielding surface 22 is here represented as transparent for reasons of clarity.

The shieldings capable of containing significant energy impacts are elements of strong rigidity and often non-deformable other than in the impact resistance phase. It is therefore preferable to dissociate the shielding surface from the structure of the aircraft while preserving the function of each. For this, the protection device according to the embodiment comprises means 300 for fixing the structure of the central casing of the wing to the front spar 12 that are distributed at three fixing (or anchoring) points which are represented in FIGS. 4 to 7.

The protection device 20 according to the embodiment provides, in order to fix the shielding surface 22 to the structure of the fuselage 2 (typically a flexible structure made of composite material so as to reduce its weight), a link of an isostatic nature. This is embodied by the use of three fixing points 310, 320 and 330 only associated with elements providing mechanical links 311, 321 and 331 solely ensuring that the six degrees of freedom are taken up: three in X, two in Z and one in X with reference to the reference frame represented in FIGS. 4 to 7.

As can be seen notably in FIG. 4, the first fixing point, or upper fixing point 310, is situated on the upper part of the central casing 13, close to the first rib 24.

More specifically, the upper fixing point 310 is situated straddling the side of the front spar 12 opposite the surface of intersection 3 and the first rib 24 of the central casing 13, on the upper part of the central casing 13.

The second fixing point, or lower distal fixing point 320, is situated on the lower part of the central casing 13, close to the first rib 24.

More specifically, the lower distal fixing point 320 is situated straddling the side of the front spar 12 opposite the surface of intersection 3 and the first rib 24 of the central casing 13, on the lower part of the central casing 13.

The third fixing point, or proximal fixing point 330, is situated on the lower part of the central casing 13, close to the surface of intersection 3 (close to the fuselage 1).

This position corresponds to the presence of a stiffening rib for the central casing of the fuselage (not represented).

The first and second mechanical links 311, 321 each comprise a pair of attachment fittings 312a, 312b and 322a, 322b. (See FIG. 5)

A pair of attachment fittings should be understood here to mean reinforcing elements which link together two parts that can move relative to one another by an articulation movement. These two elements form a hinge.

Figure 5:
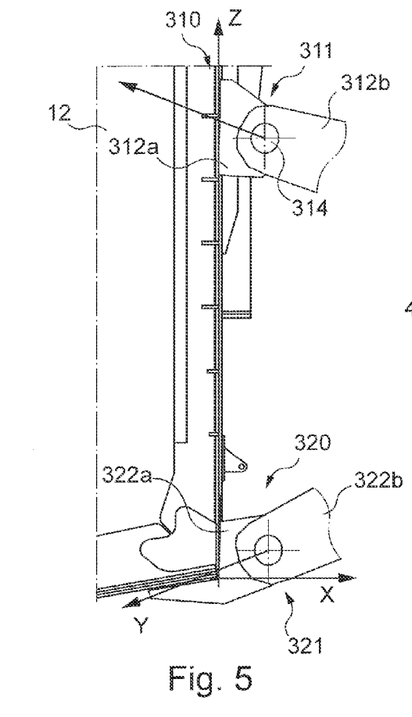
FIG. 5 is a schematic representation from the side of two fixing points fixing the protection device of FIG. 4 to the front spar of the wing.
Figure 6:
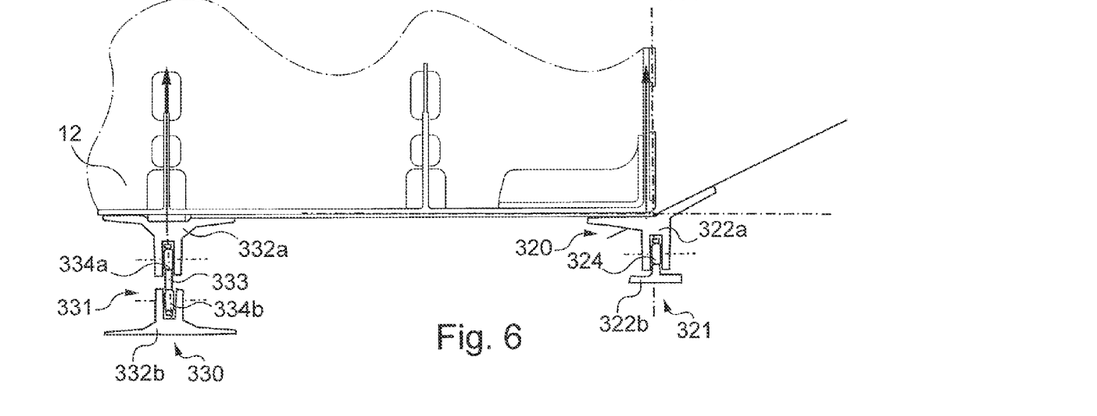

The first rear attachment fitting 312a, fixed straddling the side of the front spar 12 opposite the surface of intersection 3 and the first rib 24 of the central casing 13 at the upper end of the first rib 24, forms a hinge with the front attachment fitting 312b which is inserted between the jaws of the rear attachment fitting 312a. The first front attachment fitting 312b is, for its part, fixed to the rear surface of the shielding surface 22. The rear and front attachment fittings 312a, 312b are linked by a first shear bolt 314, an element which has the advantage of being easily and quickly installed.

The first mechanical link 311 is fitted in such a way as to allow movement only on X and Z; that is to say, respectively, in the direction normal to the first rib 24 and in the direction of elongation of the central casing 13, i.e. vertically in the plane of the first rib 24.

These movements in the horizontal direction in the plane of the first rib 24 are therefore ideally prescribed, and in reality limited to a displacement of plus or minus 1 mm.

The second rear attachment fitting 322a, fixed straddling the side of the front spar 12 opposite the surface of intersection 3 and the first rib 24 of the central casing 13 at the lower end of the first rib 24, forms a hinge with the front attachment fitting 322b which is inserted between the jaws of the second rear attachment fitting 322a.

The second front attachment fitting 322a is, for its part, fixed to the rear surface of the shielding surface. The rear and front attachment fittings 322a, 322b are linked by a first shear bolt 324.

On the other hand, unlike the first mechanical link 311, the second mechanical link 321 is configured in such a way as to allow the movements in all three directions X, Y and Z, that is to say equally in the direction normal to the first rib 24 and in the plane of this rib.

This notably makes it possible to retain degrees of freedom at the point where the deformations upon impact will be the greatest.

Figure 7:
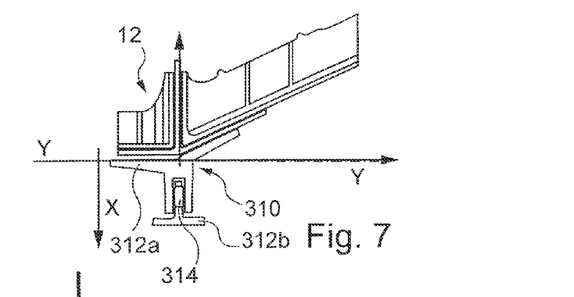
FIG. 7 is a schematic representation from above of another fixing point for the protection device of FIG. 4.

To ensure the isostatic nature of all of the three mechanical links 311, 321 and 331, the third mechanical link 331 allows only displacements in the direction normal to the first rib 24.

For this, the third mechanical link 331 comprises a third rear attachment fitting 322a, fixed to the spar 12 in the lower part of the central casing 13, close to the surface of intersection 3 (close to the fuselage 2). The third mechanical link 331 also comprises a third front attachment 332b, fixed to the rear of the shielding surface 22. Unlike the preceding two links, the third rear and front attachment fittings 332a, 332b are linked via a bar 332 situated between jaws of the attachment fittings.

Figure 8:
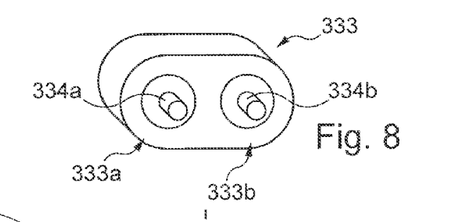
FIG. 8 is a schematic representation in perspective of a fixing element of the device.

This bar, the form of which can be seen in FIG. 8, comprises two spherical bearings 333a and 333b pierced respectively facing the jaws of each of the rear and front attachment fittings 332a, 332b. These spherical bearings 333a, 333b are intended for the passage of two shear bolts 334a, 334b which ensure the link between the third and rear attachment fittings 332a and 332b.

This configuration of the elements forming the third mechanical link 330 ensures the degree of freedom on X, that is to say in the direction normal to the spar 12 (which is the normal direction of the first rib 24), while blocking the degrees of freedom on Y and on Z.

More specifically, in these latter two directions, the displacements are limited to plus or minus 1 mm.

Optionally, additional links 400 for linking the shielding surface 22 to the structure of the fuselage 2 can be provided. As can be seen in FIG. 4 where they are represented in cross section, these fixings are distributed evenly at the join between the surface of intersection 11 with the fuselage and the inner edge 410 of the shielded surface 12. There are, for example, as in FIG. 4, three of them, a figure which can of course vary in other embodiments.

Figure 9:
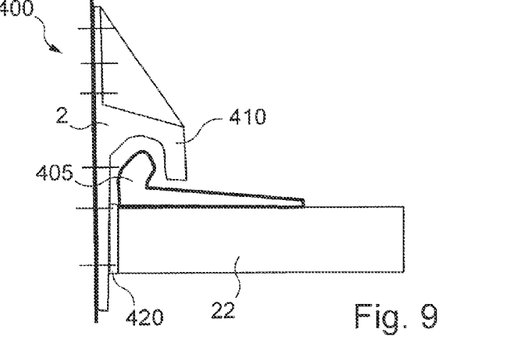
FIG. 9 is a schematic representation of the section A-A of FIG. 4.

FIG. 9 shows, by the illustration of the cross section A-A of FIG. 4, the detail of one of these additional links 400.

It comprises a shielding link 405 which protrudes from the rear of the shielding surface 22, normally thereto. This lug 405 is intended to cooperate with a fuselage hook 410 which protrudes from the skin of the fuselage 2, normally thereto. The lug 405 and the hook 410 are not, other than in an impact situation, in contact. Their presence therefore has no influence on the isostatic nature of the link between the shielding surface 22 and the central casing 13 of the wing in a nominal situation.

On the other hand, during the impact, the additional links 400 make it possible to transfer much of the forces in the plane normal to the front spar 12 (on X) to the skin of the fuselage 2.

One or more of the additional links 400 can be completed by the fitting of an elastomer seal 420 between the fuselage and the shielding surface 22, to avoid any friction between these two elements generated by the structural displacements and the vibrations. Preferably, such a seal is secured (by bonding) to the fuselage 2.

The examples which have just been described are only possible embodiments of the embodiment, which is not limited thereto. While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for protecting a front spar structure of a central casing of an aircraft wing and at least one item of equipment situated in the wing, the device comprising:
   a shielding surface extending in front of the front spar of the central casing, from a surface of an intersection between the wing and the fuselage delimited by the root of the wing, transversely to the surface of intersection, to a first rib of the central casing partially surrounding the at least one item of equipment; and
   a plurality of mechanical links fixing the shielding surface to the central casing to produce an isostatic link.

2. The protection device of claim 1, wherein the plurality of mechanical links fixing the shielding surface to the central casing comprises a first mechanical link from the shielding surface to the first rib of the central casing.

3. The protection device of claim 2, wherein the plurality of mechanical links fixing the shielding surface to the central casing comprise a second mechanical link from the shielding surface to the first rib of the central casing.

4. The protection device of claim 3, wherein the plurality of mechanical links fixing the shielding surface to the central casing comprises a third mechanical link from the shielding surface to the front spar.

5. The protection device of claim 4, wherein the shielding surface is closer to the at least one item of equipment than to a leading wing surface.

6. The protection device of claim 5, wherein the shielding surface has a C-shaped section in the plane of the surface of intersection.

7. The protection device of claim 5, wherein the shielding surface comprises an edge normal to the surface of intersection.

8. The protection device of claim 5, wherein the shielding surface closely follows the form of the at least one item of equipment.

9. The protection device of claim 8, wherein the shielding surface has at least one opening for the passage of the at least one item of equipment.

10. The protection device of claim 9, further comprising: at least one additional link linking the shielding surface to the structure of the fuselage of the aircraft, the additional link comprising a lug protruding from the rear of the shielding surface that is configured to mate with a fuselage hook protruding from the skin of the fuselage, the lug and hook being intended to cooperate with one another.

11. The protection device of claim 10, wherein the shielding surface has a honeycomb structure produced with an aluminum alloy.

12. The protection device as claimed in claim 11, having a variable thickness.

13. An aircraft wing comprising a central casing and at least one item of equipment in the internal space of the wing, comprising: a protection device for a front spar structure of the central casing and for the at least one item of equipment comprising a shielding surface extending in front of the front spar of the central casing, from a surface of intersection between the wing and a fuselage delimited by the wing root, transversely to the surface, to a first rib of the central casing partially surrounding the at least one item of equipment, the protection device further comprising a plurality of mechanical links between the shielding surface to the central casing to produce an isostatic link.

14. The aircraft wing of claim 13, wherein the plurality of mechanical links that fix the shielding surface to the central casing comprises a first mechanical link that couples the shielding surface to the first rib of the central casing while allowing movement of the shielding surface in a plane of the first rib.

15. The aircraft wing of claim 14, wherein the plurality of mechanical links fixing the shielding surface to the central casing comprises a second mechanical link coupling the shielding surface to the front spar while allowing movement of the shielding surface in a direction normal to the first rib of the central casing.

16. The aircraft wing of claim 15, wherein the plurality of mechanical links fixing the shielding surface to the central casing comprises a third mechanical link that couples the shielding surface to the first rib of the central casing while allowing movement of the shielding surface.

17. The aircraft wing of claim 13 wherein the protection device is set back from an aerodynamic surface of the aircraft wing within the internal space.

18. The aircraft wing of claim 13 wherein the protection device is substantially rigid.

\* \* \* \* \*